Figure 1:
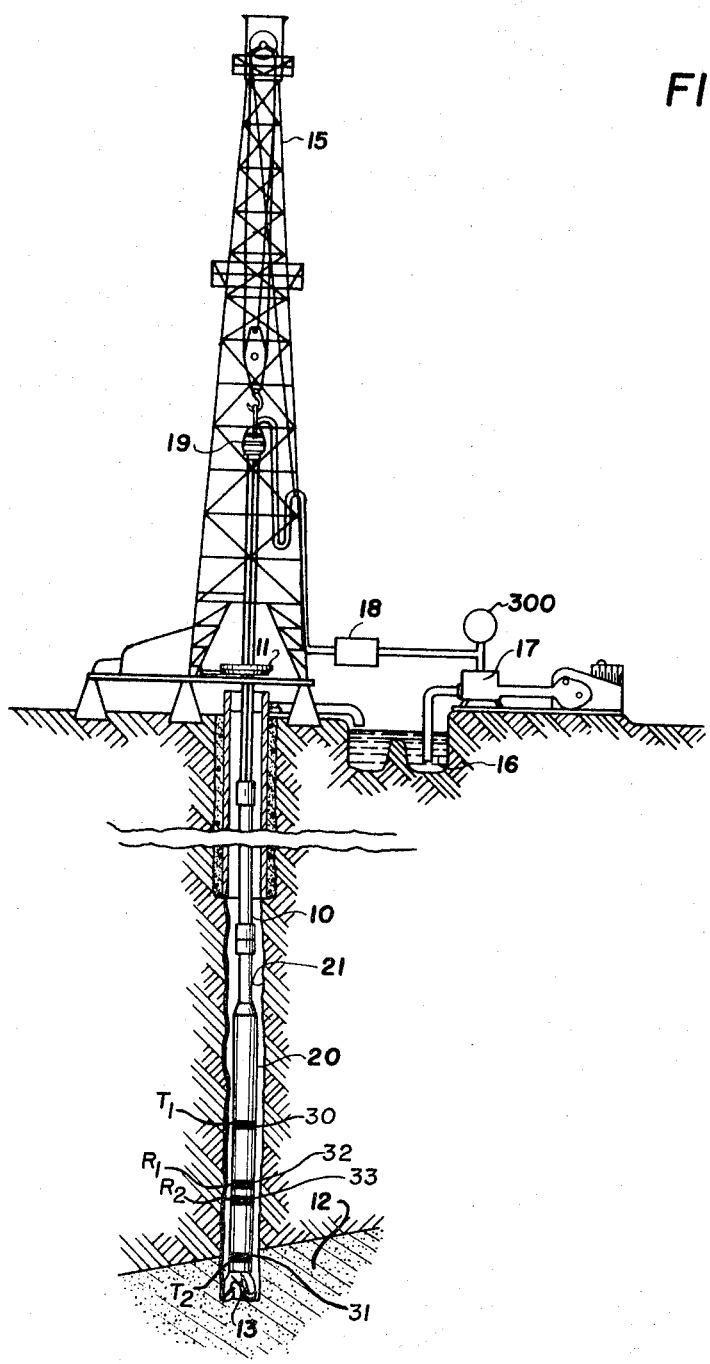

Feb. 21, 1967                    J. J. ARPS                     3,305,771
       INDUCTIVE RESISTIVITY GUARD LOGGING APPARATUS INCLUDING
                TOROIDAL COILS MOUNTED ON A CONDUCTIVE STEM
Filed Aug. 30, 1963                                     2 Sheets-Sheet 1

JAN J. ARPS
INVENTOR.

BY D. Care Richards

JAN J. ARPS
INVENTOR.

BY

United States Patent Office 3,305,771
Patented Feb. 21, 1967

3,305,771
INDUCTIVE RESISTIVITY GUARD LOGGING
APPARATUS INCLUDING TOROIDAL COILS
MOUNTED ON A CONDUCTIVE STEM
Jan J. Arps, Dallas, Tex., assignor to Arps Corporation,
Dallas, Tex., a corporation of Delaware
Filed Aug. 30, 1963, Ser. No. 305,708
6 Claims. (Cl. 324—6)

This invention relates to guard logging and more particularly to a method and system for control of current induced in earth formations as to provide high resolution as to changes in the character of formations penetrated by a borehole.

In electrical well logging, characteristics of the flow of current into formations at the walls of the borehole are employed to permit identification of the location of structural or fluid interfaces. It is desirable to provide control such that detailed structural features encountered along the length of the borehole are not masked. It has been found that alternating current at very low power levels may be caused to flow in a controlled manner into earth formations surrounding a borehole and detected so that selective measurement of a restricted portion of the current flowing to the formation may provide an indication of formation resistivity without interference from the effects of mud salinity or borehole variations. The present invention is directed to a guard logging method of formation resisitivity measurement.

More particularly, in accordance with the invention, there is provided a pair of toroid transmitters mounted in spaced apart relation on a conductor having contact with the formations both above and below the transmitters. The transmitters are arranged and excited for inducing alternating current in the conductor instantaneously in opposite directions. A pair of receivers are mounted as to be coupled to the currents flowing in the conductor. They are positioned symmetrically between the transmitters. Circuit means are provided for measurement of the signals induced in the receivers. The spacing between the receivers can be adjusted to the desired sensitivity and the resolution of the system.

In a further aspect of the invention, there is provided a well logging method in which alternating currents are induced at spaced points along a conductor in a well bore for flow instantaneously in opposite directions with the current flow shunted to the formations both above and below such points. The current induced in the conductor is sensed at two points symmetrically located with respect to the first and second points for measuring the differences in potentials sensed at the latter points.

Figure 2:
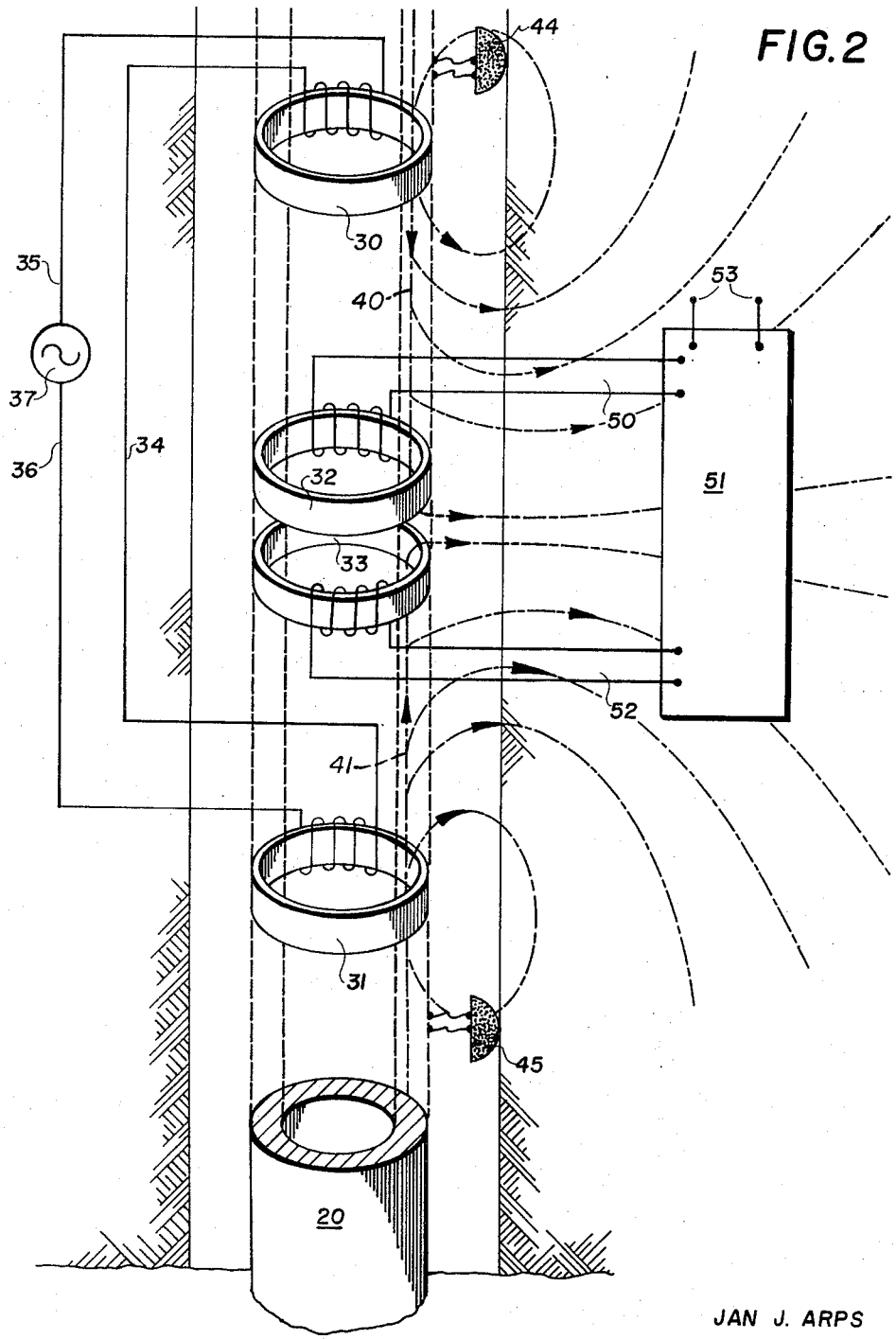

For a more complete understanding of the present invention and for further objects and advantages thereof, reference may now be had to the following description taken in conjunction with the accompanying drawings in which:

FIGURE 1 is an elevation view of the well showing the borehole in section and embodying the present invention;

FIGURE 2 schematically illustrates the operation of the present invention; and

Figure 3:
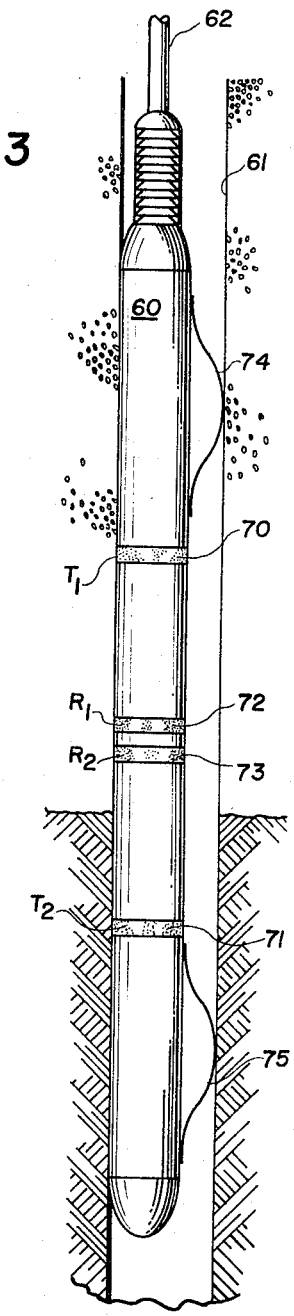

FIGURE 3 illustrates a wire line logging system embodying the present invention.

In FIGURE 1, one embodiment of the present invention is illustrated wherein inductive guard logging is carried out during the course of a drilling operation. A drill stem 10 is driven by a rotary table 11 for penetration of a formation 12 by a bit 13. The bit 13 is connected to the drill stem 10 by a sub 20. The drill stem 10 is supported by conventional draw works in a derrick 15. Drilling mud from a slush pit 16 is forced through the drill stem 10 by a mud pump 17 after flow through a detector 18 and a hose leading to a swivel 19.

It is a purpose of the present invention, in one aspect thereof, to provide for continuous measurement at the earth's surface of the resistance or impedance of a highly restricted zone of the formations along the borehole wall which may or may not be invaded by well drilling fluid. In accordance with the invention, a logging installation is provided in the sub 20. While the installation is illustrated as located adjacent to the bit 13, it will be understood that the installation may be made at any point along the drill stem 10.

Sub 20 is provided with a pair of transmitting toroidal coils 30 and 31. A pair of receiving toroidal coils 32 and 33 are mounted closely adjacent to one another and symmetrical with respect to the mid-point between the toroids 30 and 31.

A portion of the system of FIGURE 1 is illustrated in enlarged diagrammatic form in FIGURE 2. It will be noted that the transmitters 30 and 31 include a magnetic core each having a winding thereon. The windings are interconnected by way of conductor 34. The other terminals of the windings are connected by way of conductors 35 and 36 to an alternating current generator 37. The transmitter windings are connected in series opposition so that current will be induced in the sub 20 in direction such that the relative instantaneous current flow will be as represented by the flow in the paths 40 and 41. The current induced upon excitation of the toroid 30 is opposite in direction at any instant to the current induced upon excitation of the toroid 31. The source 37 maintains the voltage induced in the current loop essentially constant.

The receivers 32 and 33 are mounted on sub 20 between the toroids 30 and 31. Preferably they are spaced closely adjacent one another and are symmetrically located with respect to the transmitters 30 and 31. The winding of receiver 32 is connected by way of circuit 50 to a sensing system 51. The winding of toroid 33 is connected by way of circuit 52 to the sensing system 51. Preferably the voltages from receivers 32 and 33, which are due to current flow in opposite directions through receivers 32 and 33, resepctively, are applied to the sensing system 51 in phase. When the receivers are wound or are connected to unit 51 in series opposition, then if a given current passes in the same direction through both coils 32 and 33, the resultant voltages induced in the receivers are cancelled out. In contrast, a signal in receiver 32 due to current flow from transmitter 30 is added to the signal induced in receiver 33 due to current flow from transmitter 31. The total signal from unit 51 therefore truly reflects the net current passing out into the formations between the receivers 32 and 33. This is true because between the receivers 32 and 33, the currents from the two transmitters meet "head-on." It will be appreciated that current flow to and from the mandrel 20 is generally uniform in the zone between transmitter 30 and receiver 32, and in the zone between transmitter 31 and receiver 33. Current flow above and below the receivers forms a guard for current flow in the zone between receivers 32 and 33. The measurement of total current coupled to receivers 32 and 33 serves to indicate the true resistivity of the formation with minimum interference from the borehole and mud salinity effects. As the array of coils pass along the borehole in which there are transitions from one formation to another, the voltage output at terminals 53 will depict in great detail the resistivities of the formations encountered.

As illustrated, a pair of contacts 44 and 45 engage the walls of the borehole above transmitter 30 and below transmitter 31 respectively. In the case where the logging operation is conducted while drilling, contact 45 is between the drill collar and borehole wall below transmitter 31 and at the bit-formation contact at the bottom of the drill stem. Contact 44 is made between the drill collar and drill pipe and the borehole wall above the transmitter 30. The long expanse of drill stem is generally characterized by contact between the drill stem and the borehole wall as the drill stem leans against and is supported by the wall. Further, the area of the flow path between the drill stem and the formation above the transmitter 30 is large so that its resistance in general is very low even without actual contact.

It is significant that the coil array senses the properties of the formations in a restricted zone, the extent of which is dependent upon the space between the receivers 32 and 33.

The voltages produced by the sensing unit 51 may be employed in the manner described in Alder U.S. Patent 2,898,088, for transmission of the unbalanced signals from unit 51 to the earth's surface through the instrumentality of the drilling fluid traveling through the drill stem to the sub 20. Pressure pulses thus employed and sensed in unit 300, FIGURE 1, may be recorded for utilization purposes.

FIGURE 3 illustrates a modification of the invention in which the logging operation is conducted through a cable supported tool 60. The tool 60 is lowered into the borehole 61 by cable 62. The tool 60 comprises an elongated cylinder for mounting coils 70 and 71. Coils 70 and 71 are toroidally wound transmitting coils as are receiving coils 72 and 73. Receiving coils 72 and 73 are positioned in a symmetrical array between coils 70 and 71. Bow springs 74 and 75 are secured to the walls of the unit 60 to complete the conductive paths to the formations above and below transmitters 70 and 71, respectively. In this system the separate circuits from the receivers 72 and 73 may extend to the surface through cable 62, to surface measuring and/or recording equipment. Alternatively, as well-known in the art, the signals may be separately transmitted to the surface on a time-sharing basis if the avoidance of cross-feed presents a problem with a given cable.

In either embodiment of the invention, an inductive coupling is established to cause flow of current along paths which are vertical in the formations. Part of the current enters the formations between the detector coils in a substantially restricted zone.

By way of example, in one embodiment of the invention, the transmitting coils 30, 31, 70 and 71 may comprise tape-wound Permalloy cores of wall thickness of the order of one-eighth to three-sixteenths inch, and one and one-half inches in width. Each of the transmitters may include windings of about 100 turns of #30 copper wire. Each of the receiving toroids 32 and 33 may have cores identical to the transmitting toroids but with windings each of 1200 turns of #30 copper wire. The spacings between transmitters and between receivers may be varied depending upon the resolution desired.

In a preferred embodiment of the invention, alternating currents induced from transmitters 30 and 31 are maintained instantaneously opposite in sense as they flow in the mandrel or stem on which they are mounted. They may be connected in series opposition to source 37 or they may be fed in parallel relation. The essential feature is that the current flow be opposite in sense. Preferably, the voltage induced by transmitters 30 and 31 is kept constant. When this is the case, the voltages induced in receivers 32 and 33 preferably will be applied to unit 51 in a series opposition relation. Thus, the signals at output terminals 53 will represent the total current flowing to the formations in the zone between the receivers 32 and 33. The signal voltage is proportional to the total current passing horizontally to the formations in a sheath between the receivers 32 and 33 and therefore reflects variations in conductivity or resistivity of the same.

With the geometry illustrated in FIGURE 2, an additional signal may be derived from unit 51 by applying the signals from the receivers 32 and 33 to a circuit in a series aiding relationship. In such case, when the impedance of the current path 40 is equal to the impedance of current path 41, the voltages induced in the receiver coils will be equal. Thus, they may be cancelled entirely when the system passes over a zone of uniform resistivity. However, when the system passes a section in which there is a transition from one formation to another, the resistivity of the paths 40 and 41 will differ, in which case a voltage will be produced in the unit 51 which will be dependent upon the nature of the interface encountered. However, it is to be emphasized that the preferred embodiment of the invention involves connection of the receiver coils 32 and 33 in a series opposition relation so that the total current flowing to the formations between the receivers 32 and 33 will be measured.

Having described the invention in connection with certain specific embodiments thereof, it is to be understood that further modifications may now suggest themselves to those skilled in the art and it is intended to cover such modifications as fall within the scope of the appended claims.

What is claimed is:

1. A system for logging a well which comprises:
    (a) a conductive stem extending along said well and movable along said well past successive earth formations through which said well passes,
    (b) a pair of toroidal transmitting coils encompassing said stem at predetermined longitudinally spaced points,
    (c) electrical source means connecting said coils in opposing senses for applying alternating current to said coils to induce instantaneously opposed electrical current flow through said stem in the region between said coils and from said region into the formations adjacent to said region,
    (d) a pair of longitudinally spaced toroidal detector coils encompassing said stem in a symmetrical array between said transmitting coils, for induction therein of signals dependent upon said current flow in said stem into formations facing said region, and
    (e) a signal utilization means connected to said detector coils for combining the signals from said coils for registration of variations in electrical resistivity of formations in said region.

2. A system for logging a well while drilling which comprises:
    (a) a conductive drill stem extending into said well and movable along said well past successive earth formations through which said well passes,
    (b) a pair of toroidal transmitting coils encompassing said drill stem at spaced points located predetermined distances above the end of said stem,
    (c) electrical source means connected to said coils in opposing senses for applying alternating current to said coils to induce instantaneously opposed electrical current flow through said drill stem in the region between said coils and from said region into the formations adjacent to said region,
    (d) a pair of longitudinally spaced toroidal detector coils encompassing said drill stem in a symmetrical array between said transmitting coils for induction therein of signals dependent upon said current flow in said drill stem and into formations facing said region, and
    (e) a signal utilization means connected to said detector coil for combining the signals from said coils for registration of variations in electrical resistivity of formations in said region.

3. A system for logging a well while drilling which comprises:
    (a) a conductive stem extending along said well and movable along said well past successive earth formations through which said well passes;
    (b) a pair of toroidal transmitting coils encompassing said stem at predetermined longitudinally spaced points,
    (c) electrical source means connecting said coils in opposing senses for applying alternating current to said coils to induce instantaneously opposed electrical current flow through said stem in the region between said coils and from said region into said formations, (d) a pair of longitudinally spaced toroidal detector coils encompassing said stem in a symmetrical array intermediate said transmitting coils for induction therein of signals dependent upon said current flow in said stem and into formations facing said region, and (e) a circuit including utilization means connecting said detector coils in series aiding relation for translation of voltages induced in said detector coils by said current flow into physical conditions indicative of variations in resistivity of formations spanned by the portion of said stem between said detector coils.

4. A system for logging a well while drilling which comprises:

(a) a conductive drill stem having a bit mounted on the end thereof for penetrating earth formations, (b) a pair of toroidal transmitting coils encompassing said drill stem at spaced points located predetermined distances above said bit, (c) means for applying alternating current to said coils to induce instantaneously opposed electrical current flow through said drill stem in the region between said coils and from said region into said formations adjacent to said region, (d) a pair of longitudinally spaced toroidal detector coils encompassing said drill stem in a symmetrical array between said transmitting coils for induction therein of signals dependent upon said current flow in said stem and into formations facing said region, (e) a circuit connecting said detector coils in series aiding relation for translation of voltages induced in said detector coils by said current flow into physical conditions detectable at the mouth of said well indicative of variations in resistivity of formations spanned by the portion of said stem between said detector coils, and (f) means for sensing and recording said conditions as a function of the depth of said bit in said well.

5. The combination set forth in claim 1 in which said conductive stem includes means for contacting the earth formations at at least one point above or below said coils.

6. The combination set forth in claim 1 in which means are provided for suspending said conductive stem in said well and structure is provided for making electrical contact between said stem and the walls of said well above and below said coils.

References Cited by the Examiner

UNITED STATES PATENTS

| | | | |
|---|---|---|---|
| 2,264,318 | 12/1941 | Lee | 324—6 |
| 2,411,696 | 11/1946 | Silverman et al. | 324—1 X |
| 2,759,143 | 8/1956 | Arps | 324—1 |
| 2,987,668 | 6/1961 | Gondouin | 324—6 |

WALTER L. CARLSON, *Primary Examiner.*

G. R. STRECKER, *Assistant Examiner.*